United States Patent
Murakami

(10) Patent No.: US 11,474,493 B2
(45) Date of Patent: Oct. 18, 2022

(54) NUMERICAL CONTROLLER, MACHINING ROUTE SETTING METHOD, AND NON-TRANSITORY COMPUTER-READABLE MEDIUM RECORDING A PROGRAM

(71) Applicant: FANUC CORPORATION, Yamanashi (JP)

(72) Inventor: Hiroki Murakami, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 398 days.

(21) Appl. No.: 16/576,095

(22) Filed: Sep. 19, 2019

(65) Prior Publication Data

US 2020/0150618 A1     May 14, 2020

(30) Foreign Application Priority Data

Nov. 9, 2018  (JP) .............................. JP2018-211398

(51) Int. Cl.
*G05B 19/404*         (2006.01)

(52) U.S. Cl.
CPC .. *G05B 19/404* (2013.01); *G05B 2219/34095* (2013.01); *G05B 2219/35261* (2013.01); *G05B 2219/50283* (2013.01)

(58) Field of Classification Search
None
See application file for complete search history.

(56) References Cited

U.S. PATENT DOCUMENTS

2005/0190185 A1 *  9/2005  Fauser .............. G05B 19/4103
                                                              345/441

FOREIGN PATENT DOCUMENTS

JP            2018-73097         5/2018

* cited by examiner

*Primary Examiner* — Sean Shechtman
(74) *Attorney, Agent, or Firm* — Wenderoth, Lind & Ponack, L.L.P.

(57) ABSTRACT

To smoothen a machining route more appropriately. A numerical controller of the present invention comprises: a machining program look-ahead unit that acquires a program for machining; a command route mathematization unit that expresses a machining route as a parametric line segment or curve on the basis of the program for the machining; and a smoothing processing unit that sets a range of smoothing for a target point of the smoothing along the parametric line segment or curve in an optional range from the target point, and performs the smoothing on the target point on the basis of the set range of the smoothing. The range of the smoothing set by the smoothing processing unit is a range in which a deviation between before the smoothing and after the smoothing on the target point is a set threshold or less.

8 Claims, 4 Drawing Sheets

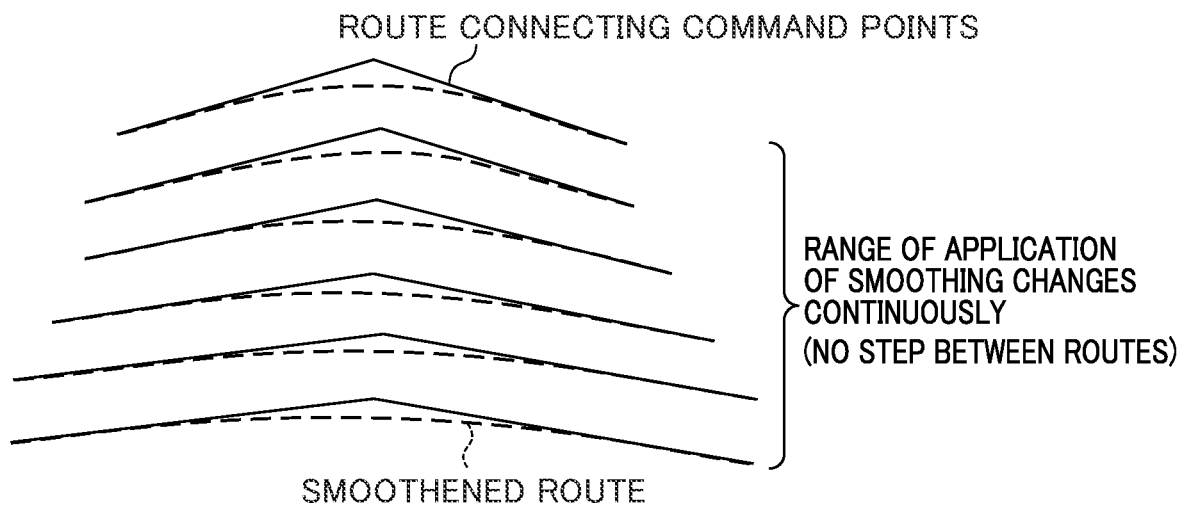
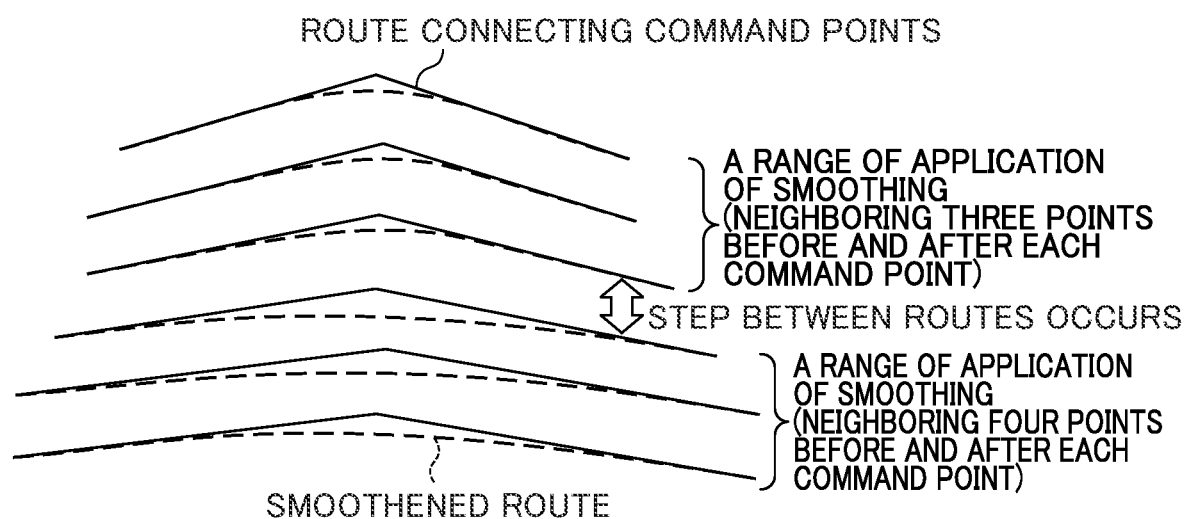

NUMERICAL CONTROLLER, MACHINING ROUTE SETTING METHOD, AND NON-TRANSITORY COMPUTER-READABLE MEDIUM RECORDING A PROGRAM

This application is based on and claims the benefit of priority from Japanese Patent Application No. 2018-211398, filed on 9 Nov. 2018, the content of which is incorporated herein by reference.

BACKGROUND OF THE INVENTION

Field of the Invention

The present invention relates to a numerical controller, a machining route setting method, and a program.

Related Art

For conventional machining using a machine tool, for example, a tool route during the machining (machining route) is set, and the set tool route is smoothened. For smoothing of the tool route, a command route given by command points is generally smoothened by setting quantum (discrete) values as a range of application of the smoothing such as the neighboring N (N is a natural number) points before and after each command point. Hence, even with the same tool route, a difference may be caused between smoothing results if there are different patterns of command points. To solve this problem, Patent Document 1 discloses a method of dividing a route between command points at constant intervals, and smoothing points of the division. Using this method makes it possible to acquire substantially equal points of the division independently of the presence or absence of command points on condition that the same tool route is given, and to produce similar smoothing results through smoothing of these points of the division.

Patent Document 1: Japanese Unexamined Patent Application, Publication No. 2018-73097

SUMMARY OF THE INVENTION

Regarding setting of a range of application (neighboring N points before and after each command point) of smoothing, setting the same range of application of smoothing throughout an entire route results in a large deviation from an original route in an area of a large curvature such as a corner, for example, and conversely, results in a small deviation from the original route in a flat area. This necessitates implementation of smoothing in such a manner that a range of application (neighboring N points before and after each command point) of the smoothing is changed on an as-needed basis in response to the shape of a tool route in order to control a deviation from the original route to be a substantially constant amount (designated tolerance). As shown in FIG. 5B, for example, if such smoothing is performed on adjacent routes with gradually changing shapes, discontinuous change in a range of application of the smoothing may occur between adjacent ones of the routes (a step between routes may occur) smoothened in different ranges of application (with different values of N). This has caused a problem that such change shows up on a machined workpiece as a crease, etc. In this regard, according to the method disclosed in Patent Document 1, on condition that the same tool route is given, substantially equal points of division can be acquired independently of the presence or absence of command points and similar smoothing results can be produced through smoothing of these points of the division. If the smoothing is to be performed on adjacent routes with gradually changing shapes, however, a range of application of the smoothing is still changed discontinuously between adjacent ones of the routes. Hence, such change can show up on a machined workpiece as a crease, etc.

The present invention is intended to achieve more appropriate smoothing of a machining route by expressing the smoothing route as a line segment or a curve and setting a range of application of the smoothing in such a manner as to change the range of application continuously.

(1) A numerical controller of the present invention (numerical controller 1 described later, for example) controls machining by a machine tool and comprises: a program acquisition unit (machining program look-ahead unit 11a described later, for example) that acquires a program for the machining; a mathematization unit (command route mathematization unit 11b described later, for example) that expresses a machining route as a parametric line segment or curve on the basis of the program for the machining; a smoothing application range setting unit (smoothing processing unit 11c described later, for example) that sets a range of smoothing for a target point of the smoothing along the parametric line segment or curve in an optional range from the target point; and a smoothing processing unit (smoothing processing unit 11c described later, for example) that performs the smoothing on the target point on the basis of the set range of the smoothing. The range of the smoothing set by the smoothing application range setting unit is a range in which a deviation between before the smoothing and after the smoothing on the target point is a set threshold or less.

(2) in the numerical controller described in (1), the mathematization unit may mathematize the machining route as a polynomial to express the machining route as a parametric line segment or curve.

(3) In the numerical controller described in (1) or (2), the mathematization unit may express the machining route as a mathematical formula based on at least any of a straight line, an arc, a spiral, Bezier, a spline, and a NURBS.

(4) In the numerical controller described in (1) to (3), the smoothing processing unit may perform the smoothing on the target point by means of at least any of conversion into a spline curve, conversion into a NURBS curve, moving average filtering, weighted average filtering, and Gaussian filtering.

(5) in the numerical controller described in (1) to (4), the smoothing application range setting unit may set a maximum range of the smoothing on condition that the deviation between before the smoothing and after the smoothing on the target point is the set threshold or less.

(6) In the numerical controller described in (5), the smoothing application range setting unit may determine the range of the smoothing on the basis of a solution of the maximum range of the smoothing found by performing convergence processing on condition that the deviation between before the smoothing and after the smoothing on the target point is the set threshold or less.

(7) A machining route setting method of the present invention is implemented by a numerical controller that controls machining by a machine tool. The method comprises: a program acquisition step of acquiring a program for the machining; a mathematization step of expressing a machining route as a parametric line segment or curve on the basis of the program for the machining; a smoothing application range setting step of setting a range of smoothing for a target point of the smoothing along the parametric line segment or curve in an optional range from the target point; and a smoothing processing step of performing the smoothing on the target point on the basis of the set range of the smoothing. The range of the smoothing set in the smoothing application range setting step is a range in which a deviation between before the smoothing and after the smoothing on the target point is a set threshold or less.

(8) A program of the present invention causes a computer to realize: a program acquisition function of acquiring a program for machining; a mathematization function of expressing a machining route as a parametric line segment or curve on the basis of the program for the machining; a smoothing application range setting function of setting a range of smoothing for a target point of the smoothing along the parametric line segment or curve in an optional range from the target point; and a smoothing processing function of performing the smoothing on the target point on the basis of the set range of the smoothing. The range of the smoothing set application by the smoothing range setting function is a range in which a deviation between before the smoothing and after the smoothing on the target point is a set threshold or less.

According to the present invention, smoothing of a machining route is achieved more appropriately by expressing the machining route as a line segment or a curve and setting a range of application of the smoothing in such a manner as to change the range of application continuously.

BRIEF DESCRIPTION OF THE DRAWINGS

FIG. 5A is a schematic view showing an effect achieved by performing smoothing of the present invention; and FIG. 5B is a schematic view showing an effect achieved by performing smoothing of the conventional technique.

DETAILED DESCRIPTION OF THE INVENTION

Figure 1:
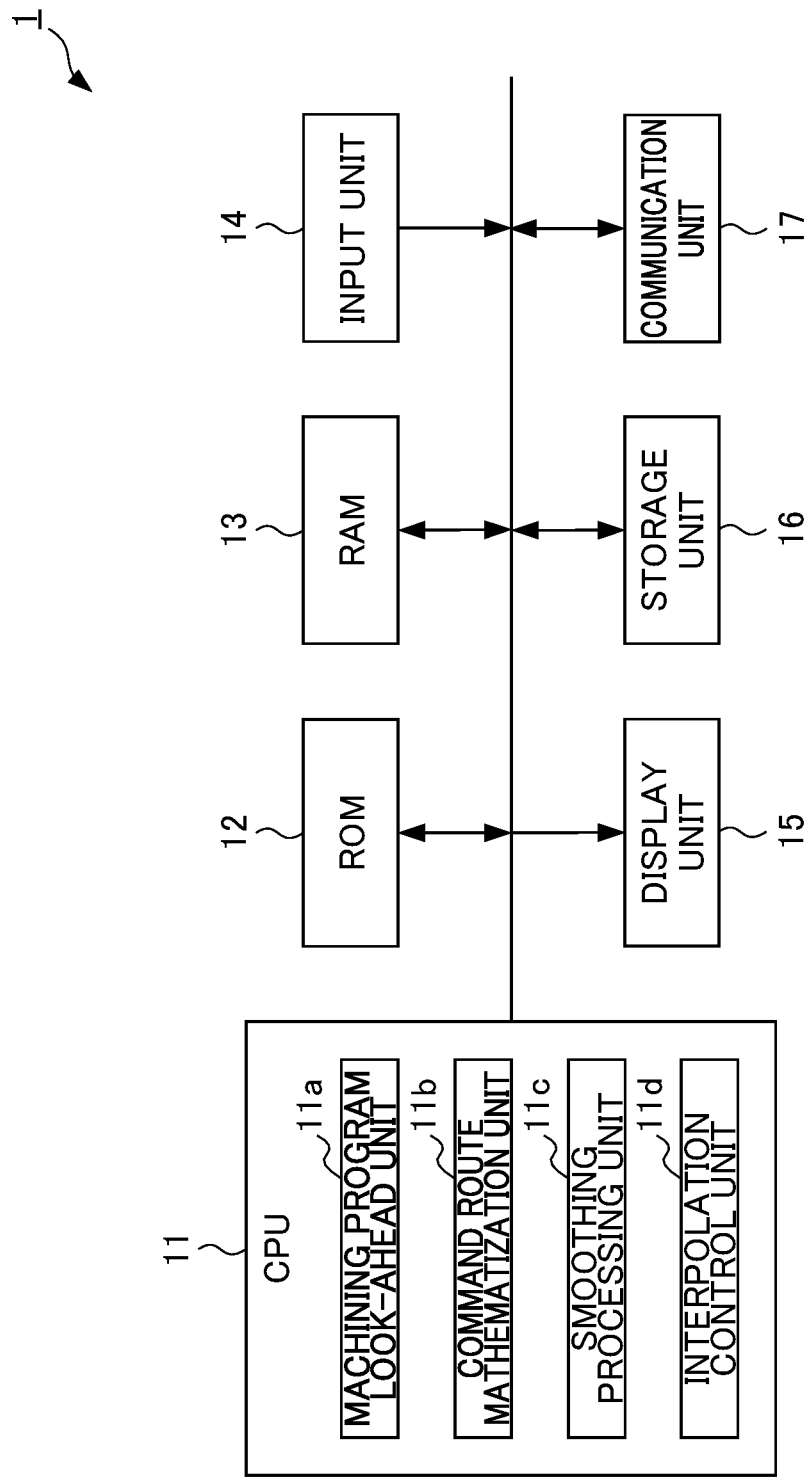
FIG. 1 is a block diagram showing the configuration of a numerical controller according to an embodiment of the present invention.

An embodiment of the present invention will be described below by referring to the drawings.

Configuration

FIG. 1 is a block diagram showing the configuration of a numerical controller 1 according to the embodiment of the present invention. As shown in FIG. 1, the numerical controller 1 includes a central processing unit (CPU) 11, a ROM 12, a RAM 13, an input unit 14, a display unit 15, a storage unit 16, and a communication unit 17. Routes set in relation to machining, including a command route defined in a machining program, a smoothened command route, and a movement route of a tool (tool route) during machining acquired by performing interpolation processing on the smoothened command route, will collectively be called a "machining route," as appropriate.

The CPU 11 executes various programs stored in the storage unit 16 to control the numerical controller 1 entirely. For example, the CPU 11 executes a program for performing processing of generating a tool route during machining (hereinafter also called "tool route generation processing"). By executing the program for the tool route generation processing, the following functional structures are formed in the CPU 11: a machining program look-ahead unit 11a, a command route mathematization unit 11b, a smoothing processing unit 11c, and an interpolation control unit 11d.

The machining program look-ahead unit 11a acquires a program for machining to be executed by the numerical controller 1 (machining program) from the storage unit 19, or from a server connected through a network, for example. This acquired machining program defines a command route (layout of command points) indicating a route for the machining generated by a computer aided manufacturing (CAM) system. The command route mathematization unit 11b mathematizes the command route, given by discrete command points defined in the machining program, as a continuous parametric line segment or curve. For example, the command route mathematization unit 11b expresses the command route as a mathematical formula (polynomial) corresponding to a straight line, an arc, a spiral, Bezier, a spline, or a non-uniform rational B-spline (NURBS), for example. This resolves the problem that an approximate curve route is largely changed by the presence or absence of command points even with the same tool route, while allowing a range of application of smoothing to be set continuously for each point on the route as will be described later.

Figure 2:
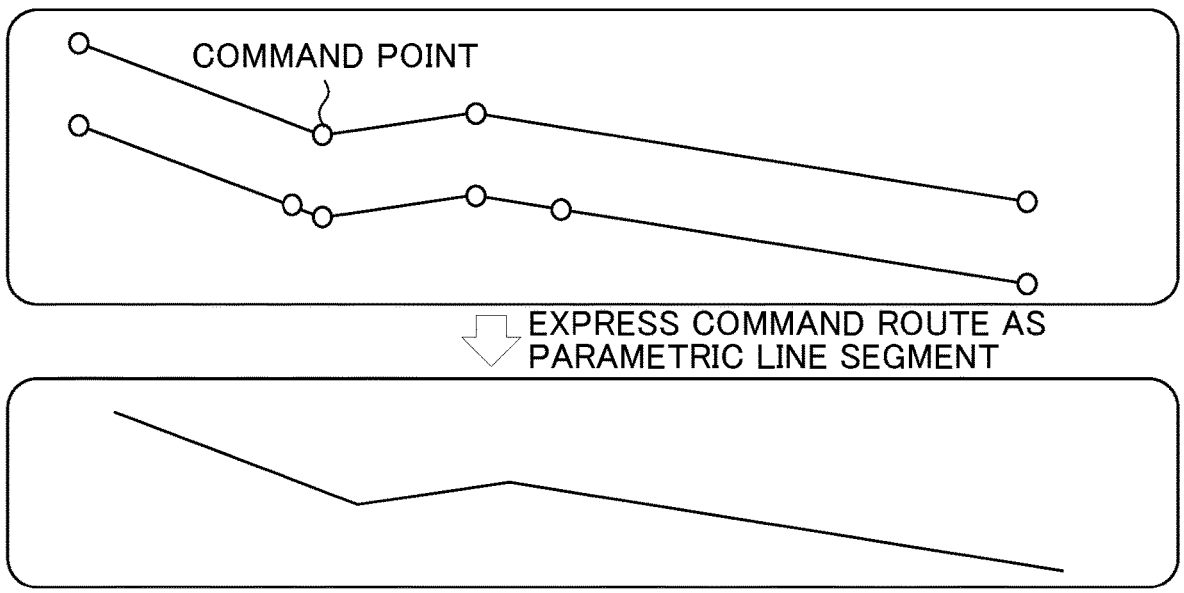
FIG. 2 is a schematic view showing a relationship between a command route defined in a machining program and a mathematized parametric line segment.

FIG. 2 is a schematic view showing a relationship between a command route defined in a machining program and a mathematized parametric line segment. As shown in FIG. 2, the command route mathematization unit 11b interpolates command points in the command route defined in the machining program (here, by means of linear interpolation), and expresses a route with a line segment connecting the command points as a parametric straight line. For interpolation of command points into a curve such as an arc or a spline curve, for example, the command route mathematization unit 11b expresses a route connecting the command points as a parametric curve. By doing so, even if there are different patterns (layouts) of command points, command routes having the same shape can be mathematized as equivalent routes by the command route mathematization unit 11b.

The smoothing processing unit, 11c performs smoothing (smoothing processing) on the command route expressed as a mathematical formula (parametric curve) by the command route mathematization unit 11b. For example, the smoothing processing unit 11c smoothens the command route mathematized (expressed as the parametric curve) by the command route mathematization unit 11b by means of smoothing processing technique such as conversion into a spline curve, conversion into a NURBS curve, moving average filtering, weighted average filtering, or Gaussian filtering. In this case, a range of application of the smoothing is set as a parameter range of a route expressed as a parametric line segment or curve. If a route is described using a route length as a parameter, for example, a range of application of the smoothing is set as a length along the route. The smoothing processing unit 11c performs the smoothing in such a manner that a deviation from an original command route defined in the machining program falls within a set tolerance. By doing so, the numerical controller 1 interpolates the route and controls each servo axis as if the route given as a command was subjected to the foregoing smoothing.

Figure 3:
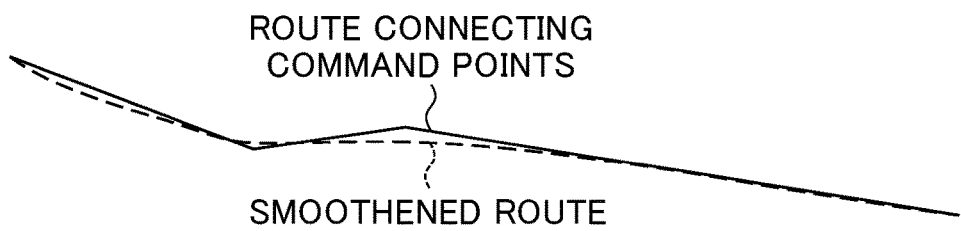
FIG. 3 is a schematic view showing a relationship between a command route and a smoothing result.

FIG. 3 is a schematic view showing a relationship between a command route and a smoothing result. In FIG. 3, for smoothing of a command route expressed as a continuous parametric line segment or curve, a range of application of the smoothing is not set for each of discrete command points but can be set continuously for optional points. This makes it possible to change a range of application of the smoothing within an optional range even if the range of application of the smoothing is required to be changed between adjacent command routes, as described as the problem to be solved by the invention. Thus, the occurrence of a large difference between smoothing results can be reduced. More specifically, if each command route is to be smoothened in such a manner as to realize a maximum range of application of the smoothing on condition that a deviation from the command route resulting from the smoothing falls within a tolerance, for example, a range of application of the smoothing is not required to be changed largely to cover an adjacent command point but, the change can be limited to a smaller extent. In this way, the occurrence of a large change in a smoothing result is prevented.

The interpolation control unit 11d performs interpolation processing on a command route smoothened by the smoothing processing unit 11c to generate a tool route indicating a movement route of a tool during machining. Further, the interpolation control unit 11d controls each servo axis of a machine tool in such a manner as to move the tool along the generated tool route.

As described above, a command route is expressed as a continuous parametric line segment or curve and smoothing is performed on this continuous line segment or curve, making it possible to change a range of application of the smoothing continuously. Thus, if command routes with gradually changing shapes are to be subjected to smoothing, for example, and if the smoothing is performed in such a manner that a deviation from an original command route resulting from the smoothing falls within a tolerance and that a maximum range of application of the smoothing is realized, a range of application of the smoothing is also changed continuously. In this way, the occurrence of discontinuous change in a smoothing range between adjacent routes and the occurrence of a step between routes can be reduced.

The ROM 12 contains various types of system programs written in advance for controlling the numerical controller 1. The RAM 13 is configured using a semiconductor memory such as a dynamic random access memory (DRAM), and stores data generated during implementation of various types of processing performed by the CPU 11. The input unit 14 is configured using an input device such as a keyboard and a mouse or a touch sensor (touch panel). The input unit 14 accepts input of various types of information from a user to the numerical controller 1.

The display unit 15 is configured using a display device such as a liquid crystal display (LCD), and displays results of various types of processing performed by the numerical controller 1. The storage unit 16 is configured using a nonvolatile storage device such as a hard disk or a flash memory, and stores a program, etc. for implementation of the tool route generation processing. The storage unit 16 stores results of various types of processing performed by the numerical controller 1 such as data indicating a generated tool route, etc.

The communication unit 17 includes a communication interface such as a wired or radio LAN or USB for implementation of signal processing on the basis of a predetermined communication standard. The communication unit 17 controls communication of the numerical controller 1 with a different device.

First Specific Example of Processing

Specific examples of processing performed by the numerical controller 1 will be described next. A first specific example of processing performed by the numerical controller 1 will be described first. In the example described herein, a command route is expressed as a curve, and this command route is subjected to smoothing using a Bezier curve. In the first example, the command route mathematization unit 11b expresses the command route as an exemplary polynomial f(u) as follows:

$$f(u)=Au^3+Bu^2+Cu+D \quad (1)$$

In the formula (1), u is a parameter (each point on the route), and A, B, C, and D are coefficients. The smoothing processing unit 11c smoothens the command route expressed by the formula (1) using a Bezier curve. The smoothened route is called fq, the command route before the smoothing is called fp, and a range of application of the smoothing (filter length) is called plus-minus L (namely, plus-minus L before and after each point on the route). Then, fq can be expressed as follows:

[Math. 1]

$$f_q(u, L) = BezierCurveCenter(\alpha, \beta, \gamma, \delta) = \\ \left(f_p(u-L), f_p\left(u-\frac{L}{3}\right), f_p\left(u+\frac{L}{3}\right), f_p(u+L)\right) \quad (2)$$

In the formula (2), fq(u,L) is continuous with respect to u. In the formula (2), BezierCurveCenter($\alpha,\beta,\gamma,\delta$) indicates the midpoint of a Bezier curve using the points $\alpha$, $\beta$, $\gamma$, and $\delta$ as control points and is defined as follows:

[Math.2]

$$BezierCurveCenter(\alpha,\beta,\gamma,\delta)=(0.5)^3(\alpha+3\beta+3\gamma+\delta) \quad (3)$$

In this case, a deviation D is a function of the filter length L and is expressed as follows:

$$D(u,L)=|fp(u)-fq(u,L)| \quad (4)$$

In this specific example, with a filter length defined as L, a filter length Lt is used that is a maximum length in a range in which a deviation resulting from smoothing falls within a preset tolerance. Then, the tolerance (Tolerance) is expressed as follows:

$$\text{Tolerance}=|fp(u)-fq(u,Lt)| \quad (5)$$

In the case of a curve route along which a curvature does not change largely, the deviation D expressed by the formula (4) and the filter length L are generally correlated with each other. As the filter length L increases, the deviation D also increases. If the filter length L is zero, the deviation D is zero. Thus, a tolerance may be set under a preset condition (a condition under which a deviation is controlled at a set value or less, for example) by setting the filter length L in a range in which this condition is fulfilled. If the filter length L to make the deviation D substantially equal to the preset tolerance cannot be acquired analytically, a solution may be found by a convergence calculation such as Newton's method. In this way, the filter length L can be acquired for each point u. As described above, the filter length L can be expressed as a function of u determined uniquely for each point u.

The filter length L acquired for each point u changes from moment to moment at each point on the route. The filter length L acquired in this way may be used as it is. Meanwhile, before use of the filter length L, the filter length L may be subjected to processing so as to eliminate a steep change in the filter length L using a method publicly known to persons skilled in the art. As a processing method of eliminating a steep change in the filter length L, the technique disclosed in Japanese Unexamined Patent Application, Publication No. 2018-073097 may be used, for example.

Second Specific Example of Processing

A second specific example of processing performed by the numerical controller 1 will be described next. In the example described herein, a command route is expressed as a line segment, and this command route is subjected to smoothing using a moving average filter. In this case, the command route mathematization unit 11b expresses a command route (line segment) connecting a point $P_n$ and a point $P_{n+1}$ (n is an integer) as a polynomial f(s) as follows:

[Math. 3]

$$f(s) = \frac{sP_n + (L_{n+1} - s)P_{n+1}}{L_{n+1}} \quad (6)$$

In the formula (6), $0<s<L_{n+1}$, and $L_{n+1}=|P_{n+1}-P_n|$. In the formula (6), s is a parameter for expressing a curve. In this specific example, s corresponds to a length along the route. A command route (line segment) connecting the point $P_{n+1}$ and a point $P_{n+2}$ can be expressed in a similar manner as follows:

[Math. 4]

$$f(s') = \frac{s'P_{n+1} + (L_{n+2} - s')P_{n+2}}{L_{n+2}} \quad (7)$$

In the formula (7), $0<s'<L_{n+2}$, and $L_{n+2}=|P_{n+2}-P_{n+1}|$. Assuming that s' is equal to $(s-L_{n+1})$, a line segment connecting the point $P_n$, the point $P_{n+1}$, and the point $P_{n+2}$ can be expressed as follows using one parameter.

[Math. 5]

$$\text{If } 0 < s < L_{n+1}, f(s) = \frac{sP_n + (L_{n+1} - s)P_{n+1}}{L_{n+1}} \quad (6)$$

$$\text{If } L_{n+1} < s < L_{n+1} + L_{n+2}, \quad (8)$$

$$f(s) = \frac{(s - L_{n+1})P_{n+1} + (L_{n+2} + L_{n+1} - s)P_{n+2}}{L_{n+2}}$$

Further, a line segment connecting points $P_0$ to $P_q$ can generally be expressed as follows using one parameter.

[Math. 6]

$$f(s) = \frac{\left(s - \sum_{m=0}^{n-1} L_m\right)P_{n-1} + \left(\sum_{m=0}^{n} L_m - s\right)P_n}{L_n} \quad (9)$$

In this formula, $$\sum_{m=0}^{n-1} L_m < s < \sum_{m=0}^{n} L_m (1 < n < q)$$

As described above, expressing a command route using one parameter makes it possible to simplify calculation for smoothing. Meanwhile, calculation for smoothing can also be made while a plurality of parameters is still used for expressing a command route. Further, the smoothing processing unit 11c uses a moving average filter to smoothen the command route expressed using the length s along the route. The smoothened route is called fq, the command route before the smoothing is called fp, and a filter function is called m. Then, the function fq after application of the filtering can be expressed as follows:

[Math. 7]

$$f_q(s) = \frac{\int_{-\infty}^{\infty} m(t) \cdot f_p(s+t)dt}{\int_{-\infty}^{\infty} m(t)dt} \quad (10)$$

The moving average filter in the range of plus-minus L is expressed as follows:

$$m(t)=1(-L \leq t \leq L)$$

$$m(t)=0(t<-L, L<t)$$

Therefore, fq can be expressed further as follows:

[Math. 8]

$$f_q(s, L) = \frac{\int_{-L}^{L} f_p(s+t)dt}{2L} \quad (11)$$

In the formula (11), fq(s,L) is continuous with respect to s. In this specific example, with a filter length defined as L, a maximum filter length corresponding to a small amount of the deviation D is used (a maximum filter length in a range in which a deviation resulting from smoothing falls within a preset tolerance). In this case, the deviation D is a function of the filter length L and can be expressed as follows:

[Math. 9]

$$D(s, L) = |f_p(s) - f_q(s, L)| = \left| f_p(s) - \frac{\int_{-L}^{L} f_p(s+t)dt}{2L} \right| \quad (12)$$

A subsequent procedure is similar to that in the first specific example of processing and accordingly will not be described.

Third Specific Example of Processing

A third specific example of processing performed by the numerical controller 1 will be described next. In the example described herein, a command route is expressed as a curve, and this command route is subjected to smoothing using a moving average filter. In this case, the command route is expressed by the command route mathematization unit 11*b* as follows:

$$f(u) = Au^3 + Bu^2 + Cu + D \quad (1)$$

The smoothing processing unit 11*c* uses a moving average filter to smoothen the command route expressed by the formula (1). The smoothened route is called fq, the command route before the smoothing is called fp, and a filter function is called m. Then, the function fq after application of the filtering can be expressed as follows:

[Math. 10]

$$f_q(u) = \frac{\int_{-\infty}^{\infty} m(u) \cdot f_p(u+t) dt}{\int_{-\infty}^{\infty} m(u) dt} \quad (13)$$

Assuming that the filter function m is a moving average filter in a range of plus-minus U, fq can be expressed as follows:

[Math. 11]

$$f_q(u, U) = Au^3 + Bu^2 + (AU^2 + C)u + \frac{BU^2}{3} + D \quad (14)$$

A subsequent procedure is similar to that is the second specific example of processing and accordingly will not be described. The embodiment of the numerical controller 1 for implementation of smoothing according to the embodiment has been described above on the basis of the configuration of the numerical controller 1.

Operation

Operation of the present embodiment will be described next by referring to the flowchart of FIG. 4.

Tool Route Generation Processing

Figure 4:
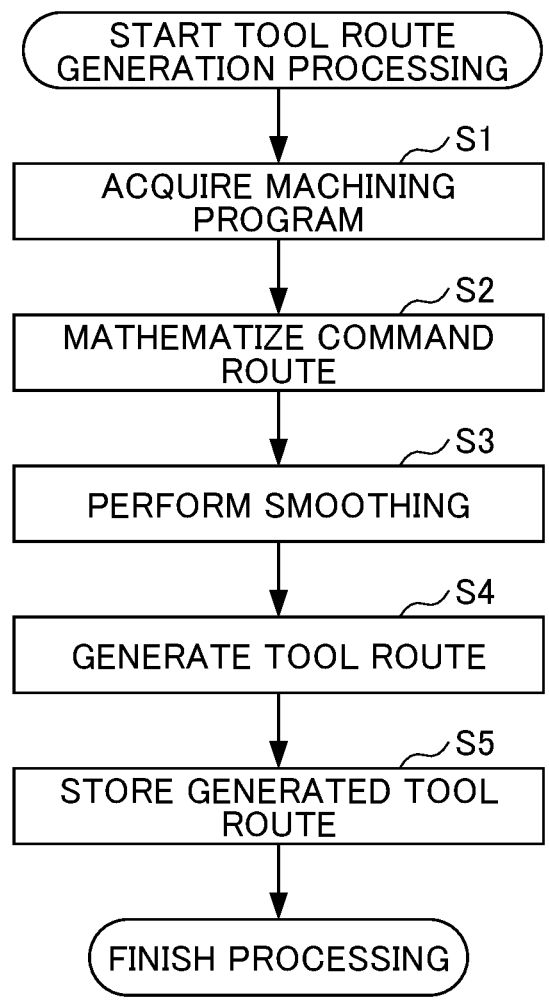
FIG. 4 is a flowchart showing a flow of tool route generation processing performed by the numerical controller.

FIG. 4 is a flowchart showing a flow of the tool route generation processing performed by the numerical controller 1. The tool route generation processing is started by input of an instruction for startup of the tool route generation processing.

In step S1, the machining program look-ahead unit 11*a* acquires a program for machining to be performed by the numerical controller 1 (machining program) from the storage unit 19, or from a server connected through a network, for example. In step S2, the command route mathematization unit 11*b* mathematizes a command route, defined in the machining program, as a continuous parametric line segment or curve. In step S3, the smoothing processing unit 11*c* performs smoothing (smoothing processing) on the command route expressed as a mathematical formula by the command route mathematization unit 11*b*.

In step S4, the interpolation control unit 11*d* performs interpolation processing on the command route smoothened by the smoothing processing unit 11*c* to generate a tool route indicating a movement route of a tool during the machining. In step S5, the interpolation control unit 11*d* stores data about the generated tool route into the storage unit 19. The data about the tool route stored in this step is read for implementation of machining by the numerical controller 1 using a machine tool, and each servo axis of the machine tool is controlled on the basis of the tool route. After implementation of step S5, the tool route generation processing is finished.

As described above, the numerical controller of the present embodiment expresses a command route as a continuous parametric line segment or curve, and performs smoothing on this continuous line segment or curve. This allows a range of application of the smoothing to be changed continuously along the command route.

FIG. 5A is a schematic view showing an effect achieved by performing smoothing of the present invention. FIG. 5B shows an exemplary case further given as a comparative example where a range of application of smoothing is set for each of discrete command points. In a state shown in the example of FIG. 5A, smoothing is performed on command routes with gradually changing shapes and the smoothing proceeds under a predetermined condition (a condition fulfilled if a deviation from an original command route resulting from the smoothing falls within a tolerance and a maximum range of application of the smoothing is realized, for example). As shown in FIG. 5A, if the smoothing is performed on the command routes with gradually changing shapes and the smoothing is performed under the predetermined condition, the present invention allows a range of application of the smoothing to be changed continuously between adjacent ones of the command routes without switching a range of application of the smoothing discretely between the adjacent command routes. This makes it possible to reduce the occurrence of a step between routes to be caused by continuous change in a range of application of the smoothing if a range of application of the smoothing is changed continuously between the adjacent command routes. By contrast, in a state shown in the example of FIG. 5B using the conventional technique, a range of application of smoothing is switched discretely between a command route in the event of three points before and after each command point as a range of application of the smoothing and a command route in the event of four points before and after each command point as a range of application of the smoothing. This causes discontinuous change in a range of the smoothing between the adjacent routes, and causes a step between routes. Namely, during smoothing on adjacent routes with gradually changing shapes, for example, the numerical controller 1 of the present embodiment allows the machining routes to be smoothened more appropriately so as to prevent the occurrence of a crease, etc. on a machined workpiece.

The present invention is not limited to the foregoing embodiment and modification but can be changed, modified, etc. in various ways. For example, in the specific examples of processing described in the foregoing embodiment, a command route is expressed as a polynomial or a line segment. However, the method of expression is not limited to this. More specifically, as long as a command route can be expressed as a continuous parametric line segment or curve, the command route may be expressed as various types of mathematical formulas. Likewise, in the specific examples of processing described in the foregoing embodiment, a command route is smoothened using a Bezier curve or a moving average filter. However, the method of smoothing is not limited to this. More specifically, various types of smoothing techniques are applicable, as long as such techniques can be used for smoothing of a continuous parametric line segment or curve.

The function of the numerical controller 1 of the foregoing embodiment can be realized entirely or partially by hardware, by software, or by a combination of hardware and software. Being realized by software means being realized by reading and execution of a program by a processor. If the numerical controller 1 is configured by hardware, the function of the numerical controller 1 can be configured partially or entirely using an integrated circuit (IC) such as an application specific integrated circuit (ASIC), a gate array, a field-programmable gate array (FPGA), or a complex programmable logic device (CPLD), for example.

The function of the numerical controller 1 can also be configured entirely or partially by software in a computer including a storage unit such as a hard disk or a ROM storing programs describing all or part of the operation of the numerical controller 1, a DRAM storing data required for calculation, a CPU, and a bus for connection between the units. In this computer, the function of the numerical controller 1 can be realized by storing information necessary for calculation into the DRAM, and making the CPU execute the programs.

These programs can be stored using various types of computer-readable media and can be supplied to the computer. The computer-readable media include various types of tangible storage media. Examples of the computer-readable media include a magnetic recording medium (a flexible disk, magnetic tape, or a hard disk drive, for example), a magneto-optical recording medium (a magneto-optical disk, for example), a CD read-only memory (CD-ROM), a CD-R, a CD-R/W, a digital versatile disk ROM (DVD-ROM), a DVD-R, a DVD-R/W, and a semiconductor memory (a mask ROM, a programmable ROM (PROM), an erasable PROM (EPROM, a flash memory, or a random access memory (RAM), for example). These programs may be distributed by being downloaded onto a computer of a user through a network.

While the embodiment of the present invention has been described in detail above, this embodiment is merely a specific example employed for implementing the present invention. The technical scope of the present invention is not limited to the above-described embodiment. Various changes to the present invention can be devised within a range not departing from the substance of the invention. These changes are also covered by the technical scope of the present invention.

EXPLANATION OF REFERENCE NUMERALS

1 Numerical controller
11 CPU
11*a* Machining program look-ahead unit
11*b* Command route mathematization unit
11*c* Smoothing processing unit
11*d* Interpolation control unit
12 ROM
13 RAM
14 Input unit
15 Display unit
16 Storage unit
17 Communication unit

What is claimed is:

1. A numerical controller that controls machining by a machine tool, comprising:
   a program acquisition unit that acquires a program for the machining;
   a mathematization unit that expresses a machining route represented by discrete command points defined in the program for the machining as a continuous parametric line segment or curve on the basis of the program for the machining;
   a smoothing application range setting unit that sets a range of smoothing for a target point of the smoothing along the parametric line segment or curve in a range from the target point; and
   a smoothing processing unit that performs the smoothing on the target point on the basis of the set range of the smoothing, wherein
   the smoothing application range setting unit sets the range of the smoothing as a range in which a deviation between before the smoothing and after the smoothing on the target point is a set threshold or less,
   wherein the smoothing is performed by the smoothing processing unit along the machining route after the machining route has been expressed as the continuous parametric line segment or curve and a range of application of the smoothing is set by the smoothing application range setting unit and is changed continuously between two or more adjacent machining routes,
   the numerical controller further comprising an interpolation control unit that controls each servo axis of the machine tool based on the smoothened machining route.

2. The numerical controller according to claim 1, wherein the mathematization unit mathematizes the machining route as a polynomial to express the machining route as a parametric line segment or curve.

3. The numerical controller according to claim 1, wherein the mathematization unit expresses the machining route as a mathematical formula based on at least any of a straight line, an arc, a spiral, Bezier, a spline, and a NURBS.

4. The numerical controller according to claim 1, wherein the smoothing processing unit performs the smoothing on the target point by means of at least any of conversion into a spline curve, conversion into a NURBS curve, moving average filtering, weighted average filtering, and Gaussian filtering.

5. The numerical controller according to claim 1, wherein the smoothing application range setting unit sets a maximum range of the smoothing on condition that the deviation between before the smoothing and after the smoothing on the target point is the set threshold or less.

6. The numerical controller according to claim 5, wherein the smoothing application range setting unit determines the range of the smoothing on the basis of a solution of the maximum range of the smoothing found by performing convergence processing on condition that the deviation between before the smoothing and after the smoothing on the target point is the set threshold or less.

7. A machining route setting method implemented by a numerical controller that controls machining by a machine tool, comprising:
   a program acquisition step of acquiring a program for the machining;
   a mathematization step of expressing a machining route represented by discrete command points defined in the program for the machining as a continuous parametric line segment or curve on the basis of the program for the machining;
   a smoothing application range setting step of setting a range of smoothing for a target point of the smoothing along the parametric line segment or curve in a range from the target point; and a smoothing processing step of performing the smoothing on the target point on the basis of the set range of the smoothing, wherein the smoothing application range setting step sets the range of the smoothing as a range in which a deviation between before the smoothing and after the smoothing on the target point is a set threshold or less, wherein the smoothing is performed by the smoothing processing step along the machining route after the machining route has been expressed as the continuous parametric line segment or curve and a range of application of the smoothing is set by the smoothing application range setting step and is changed continuously between two or more adjacent machining routes, the machining route setting method further comprising an interpolation control step of controlling each servo axis of the machine tool based on the smoothened machining route.

8. A non-transitory computer readable recording medium recording a program for making a computer to realize:

a program acquisition function of acquiring a program for machining by a machine tool;

a mathematization function of expressing a machining route represented by discrete command points defined in the program for the machining as a continuous parametric line segment or curve on the basis of the program for the machining;

a smoothing application range setting function of setting a range of smoothing for a target point of the smoothing along the parametric line segment or curve in a range from the target point; and a smoothing processing function of performing the smoothing on the target point on the basis of the set range of the smoothing, wherein the smoothing application range setting function sets the range of the smoothing as a range in which a deviation between before the smoothing and after the smoothing on the target point is a set threshold or less, wherein the smoothing is performed by the smoothing processing function along the machining route after the machining route has been expressed as the continuous parametric line segment or curve and a range of application of the smoothing is set by the smoothing application range setting function and is changed continuously between two or more adjacent machining routes, the program further makes the computer realize an interpolation control function of controlling each servo axis of the machine tool based on the smoothened machining route.

* * * * *